(12) United States Patent
Jadot et al.

(10) Patent No.: US 12,736,939 B2
(45) Date of Patent: Sep. 15, 2026

(54) SYSTEM FOR THE OPERATION AND THE ASSISTANCE IN THE OPERATION OF A CRITICAL INDUSTRIAL PROCESS AND ASSOCIATED METHOD

(71) Applicants: WORLDGRID FRANCE SAS, Bezons (FR); ELECTRICITE DE FRANCE, Paris (FR)

(72) Inventors: Franck Jadot, Pontcharra (FR); François Pebay Peyroula, Seyssins (FR); Olivier Deschamps, Crolles (FR); Jean-Claude Hocquette, Crolles (FR); Jean-Luc Doutre, Annecy le Vieux (FR); Pascal Fauquembergue, Fontenay aux Roses (FR); Laurent Rocheforti, Poissy (FR); Caroline Baumgarten, Paris (FR)

(73) Assignees: WORLDGRID FRANCE SAS, Bezons (FR); ELECTRICITE DE FRANCE, Paris (FR)

( * ) Notice: Subject to any disclaimer, the term of this patent is extended or adjusted under 35 U.S.C. 154(b) by 282 days.

(21) Appl. No.: 18/719,966

(22) PCT Filed: Dec. 7, 2022

(86) PCT No.: PCT/EP2022/084737

§ 371 (c)(1),
(2) Date: Jun. 14, 2024

(87) PCT Pub. No.: WO2023/110571

PCT Pub. Date: Jun. 22, 2023

(65) Prior Publication Data

US 2025/0155866 A1 May 15, 2025

(30) Foreign Application Priority Data

Dec. 14, 2021 (FR) ...................................... 2113493

(51) Int. Cl.
*G05B 19/05* (2006.01)
*G05B 19/042* (2006.01)

(52) U.S. Cl.
CPC ....... *G05B 19/056* (2013.01); *G05B 19/0426* (2013.01); *G05B 2219/13144* (2013.01)

(58) Field of Classification Search
CPC .............. G05B 19/0426; G05B 19/056; G05B 19/41855; G05B 2219/13144;
(Continued)

(56) References Cited

U.S. PATENT DOCUMENTS

| | | | |
|---|---|---|---|
| 5,551,034 A | 8/1996 | Herz | |
| 10,599,676 B2 * | 3/2020 | Kapadia | G06F 11/0751 |

(Continued)

FOREIGN PATENT DOCUMENTS

| | | |
|---|---|---|
| EP | 0381334 A2 | 8/1990 |
| FR | 2700401 A1 | 7/1994 |

OTHER PUBLICATIONS

International Search Report and Written Opinion issued in PCT/EP2022/084737 on Mar. 6, 2023 and translation thereof.

*Primary Examiner* — Tameem D Siddiquee
(74) *Attorney, Agent, or Firm* — ARC IP Law, PC; Joseph J. Mayo

(57) ABSTRACT

A system with a plurality of operator stations, a first sub-system for operating an industrial process, a second sub-system for assisting with the operation, a first duplicated communication network that manages exchanges in the first sub-system, a second duplicated communication network that manages exchanges in the second sub-system, and a separating device that manages exchanges between the first and the second sub-systems. The first sub-system includes an interface module that collects data items each associated with one acquisition time; a first processing module that
(Continued)

sorts the data and computes first information items; a first module that manages operator stations and sends each first information item to the operator stations. The sub-system includes a second processing module that computes second information items from the data items and from the first information items; a second module that manages operating stations and sends each second information item to the operator stations.

10 Claims, 5 Drawing Sheets

(58) Field of Classification Search
CPC ........... G05B 2219/25067; G05B 2219/31472; G05B 2219/32128; G05B 2219/33235; G05B 9/03
See application file for complete search history.

(56) References Cited

U.S. PATENT DOCUMENTS

2018/0191876 A1 7/2018 Mueller
2021/0223761 A1* 7/2021 Flood ................ G05B 19/4185

* cited by examiner

SYSTEM FOR THE OPERATION AND THE ASSISTANCE IN THE OPERATION OF A CRITICAL INDUSTRIAL PROCESS AND ASSOCIATED METHOD

This patent application is a national stage of International Application No. PCT/EP2022/084737, filed on 7 Dec. 2022, which claims priority to French Patent Application No. FR2113493, filed on 14 Dec. 2021, the specifications of which are incorporated in their entirety herein by reference.

BACKGROUND OF THE INVENTION

Technical Field of the Invention

The technical field of one or more embodiments of the invention is that of systems and methods for operating and assisting with the operation of an industrial process and more particularly that of systems and methods for operating and assisting with the operation of a critical industrial process.

At least one embodiment of the invention concerns a system for operating and assisting with the operation of a critical industrial process. At least one embodiment of the invention also relates to a method for operating an industrial process implemented by the system and a computer program product.

Description of the Related Art

For the operation of industrial processes working continuously, such as, for example, the sorting process in a sorting station or else the automatic process for manufacturing a device in a factory, it is common to use a SCADA (for "Supervisory Control And Data Acquisition") architecture carrying out data acquisition and real-time control of an industrial process via programmable logic controllers, by calculating information from the acquired data about the state of the industrial process used for its control and supervision.

To ensure the safety of the industrial process, and more particularly in the case of critical industrial processes, such as the process of managing the supply of energy by a power grid or power generation plant, the architecture must meet several safety requirements, stipulated for example by class 2 according to IEC 61513 or SIL2 according to IEC 61508. In particular, the architecture must be reliable, with high availability, i.e. fully redundant and able to meet availability requirements over a period of more than ten years, and capable of exchanging a large number of items of information, typically of the order of 60,000 elementary items of information and 20,000 digital commands, and to compute a large amount of information, typically more than 50,000 items of information, in processing times of a few hundred milliseconds to 2 or 3 seconds, and to make this information available centrally and in a time-consistent manner at the operator stations.

To meet these safety requirements, it is known to use high-level safety systems complementary to the main operation system, such as SPDS (Safety Parameter Display System) systems configured to display information essential for operational safety, possibly coupled with a fallback panel enabling the process to be put into a safe fallback state in the event of failure of the main operation system.

However, such systems have limited monitoring capacity, on the order of 1,000 to 3,000 items of information, and do not allow commands to be sent to the process. They are therefore unsuitable for large, critical industrial processes.

There is therefore a need for a system for the operation of a critical industrial process that meets the above-mentioned safety requirements and does not require additional safety systems.

BRIEF SUMMARY OF THE INVENTION

At least one embodiment of the invention offers a solution to the above-mentioned problems, by providing a reliable, high-availability industrial process operating system, centrally supplying operator stations with consistent, reliable information in real time.

At least one embodiment of the invention concerns a system for operating and assisting with the operation of a critical industrial process comprising:

A first set of operator stations each comprising a graphical interface and each being configured to:

receive instructions from an operator via the graphical interface;

display, at a current time and on request from the operator, first information from a subset of information, the subset of information being included in a set of information relating to the industrial process, the set of information comprising a group of information for each acquisition time from among a plurality of acquisition times preceding the current time, each group of information comprising first information for operating the industrial process and second information for assisting with the operation of the industrial process;

A second set of operator stations, each configured to display, at the current time and on request from the operator, the second information from the information subset;

A first sub-system for operating the industrial process working cyclically, a second sub-system for assisting with the operation of the industrial process working in an event-driven manner, and a unidirectional separating device comprised in the first sub-system and in the second sub-system, comprising a pair of computing units;

The first sub-system comprises:

An interface module configured to collect data from a plurality of programmable logic controllers each having a controller model, each item of data being associated with an acquisition time from the plurality of acquisition times, the interface module including at least one pair of computing units for each controller model, each computing unit of the pair of computing units being configured for:

collecting each item of data received by each controller having the controller model and eliminating each item of data received in duplicate;

sending to at least one controller at least one command depending on the collected data and/or instructions provided by the operator;

the computing units of the interface module working in asynchronous redundancy;

A first processing module including a pair of computing units, each computing unit of the pair of computing units being configured for:

receiving the collected data from each computing unit of the interface module;

sorting the received data according to their acquisition time and eliminating data received in duplicate;

computing for each acquisition time the first information of the corresponding information group from the corresponding sorted data;

sending each first computed information item to each computing unit of the separating device;

The computing unit of the first processing module working in active redundancy;

A first module for managing the operator stations including a computing unit for each operator station in the first set of operator stations, each computing unit being configured for:

receiving each first computed information item;

sending to the corresponding operator station each first information item corresponding to the requested subset of information;

managing the graphical interface of the corresponding operator station;

A first dual communication network having different first and second channels, comprising a first redundancy module distributed over each computing unit of the first sub-system, each computing unit of the first sub-system being configured for:

sending, to the first redundancy module, each message intended for at least one other computing unit of the first sub-system, simultaneously on the first and second channels;

receiving each message intended for it from the first redundancy module and sending an acknowledgment to the first redundancy module;

the first redundancy module being configured for:

receiving the message sent via the first channel and/or via the second channel;

deleting the message received via the second channel if the message has been received via the first channel;

modifying the received message by adding an acknowledgment request;

disseminating to the other computing unit of the first sub-system the modified message simultaneously on the first channel and the second channel;

the second sub-system comprising:

A second processing module including a pair of computing units, each computing unit of the pair of computing units being configured for:

receiving the collected data and the first computed information from each computing unit of the separating device;

eliminating any duplicate data and first information received;

computing for each acquisition time the second information of the corresponding information group from the corresponding sorted data and first information;

the computing units of the second processing module working in active redundancy;

A second module for managing the operator stations including a computing unit for each operator station in the second set of operator stations, each computing unit being configured for:

receiving each second computed information item;

sending to the corresponding operator station each second information item corresponding to the requested subset of information;

managing the graphical interface of the corresponding operator station;

A second dual communication network having different first and second channels, comprising a second redundancy module distributed over each computing unit of the second sub-system, each computing unit of the second sub-system being configured for:

sending, to the second redundancy module, each message intended for at least one other computing unit of the second sub-system, simultaneously on the first and second channels;

receiving each message intended for it from the second redundancy module and sending an acknowledgment to the second redundancy module;

the second redundancy module being configured for:

receiving the message sent via the first channel and/or via the second channel;

deleting the message received via the second channel if the message has been received via the first channel;

modifying the received message by adding an acknowledgment request;

disseminating to the other computing unit of the second sub-system the modified message simultaneously on the first channel and the second channel.

Thanks to one or more embodiments of the invention, the system is separated into two distinct sub-systems by a separating device, the first sub-system grouping together the features required for operation and the second sub-system grouping together the operation assistance features that are less demanding in terms of safety, which makes it possible to limit the information to be managed by the first sub-system and thus to implement cyclic working to systematically acquire and compute all the essential information at each cycle, while remaining compatible with the power levels achievable by current computing unit technology. This cyclic working guarantees both the predictability of response times and the reliability of the information processed. The separation of features also facilitates system qualification by reducing the amount of work required for safety demonstrations.

The separating device sends all the information acquired and computed by the first sub-system to the second sub-system, with the second sub-system detecting changes in values to work in event mode. Being unidirectional, the separating device ensures that any failures in the second sub-system do not interfere with the reliability of the first sub-system.

Coupling the two sub-systems via the separating device enables central performance and having each operator seated at an operator station, which juxtaposes screens refreshed separately by each of the two sub-systems.

Within the first sub-system, a pair of computing units of the interface module retrieves the data acquired by a single controller technology and eliminates duplicates, which allows the decoupling between the management of the redundancy of each controller technology and the management of redundancy by the system according to one or more embodiments of the invention. At the interface module, redundancy is provided by each pair of computing units working in asynchronous redundancy, that is, each computing unit carries out the same tasks on the data assigned to it without synchronization with the other computing units.

The pair of computing units of the first processing module retrieves the data acquired by each pair of computing units from the interface module and orders them chronologically, eliminating the duplicates, which makes it possible to ensure the chronological coherence and uniqueness of the data. The information necessary for the operation of the process is then computed from the sorted and therefore temporally coherent data.

The computing unit pair of the second processing module retrieves the acquired and sorted data and the first information computed by the first sub-system, and deletes duplicates, thus ensuring the temporal consistency and uniqueness of the data and first information. Information for assisting with the process operation, known as second information, is then computed from the sorted and therefore time-coherent data and first information.

At the first processing module and second processing module, redundancy is provided by the pair of computing units working in active redundancy, that is, carrying out the same tasks simultaneously and sending only the information computed by one of the computing units.

Each computing unit in the first operator station management module retrieves the first computed information and sends the first information requested by the operator to the operator station in the associated first set of operator stations, and each computing unit in the second operator station management module retrieves the second computed information and sends the second information requested by the operator to the operator station in the associated second set of operator stations. As each operator station in the first set of operator stations is identical, and each operator station in the second set of operator stations is identical, redundancy is ensured at the operator station level.

Following the display of the requested information, the operator can provide an instruction via the graphical interface of an operator station in the first set of operator stations to modify the operation of the industrial process. The instruction is transmitted to at least one controller concerned via a command transmitted by the pair of computing units of the corresponding interface module.

During communications between computing units, the redundancy is ensured by the duplication of the first communication network and second communication network, and the chronological coherence is ensured by the first redundancy module and second redundancy module using an acknowledgment mechanism to ensure the proper simultaneous reception of the messages by the set of recipient computing units.

The chronological coherence and the uniqueness of the data and information, as well as the redundancy are therefore ensured at each point of the system, which therefore meets the requirements of high availability, reliability, and response time predictability.

In addition to the features mentioned in the preceding paragraph, the system according to at least one embodiment of the invention may have one or more complementary features from the following, taken individually or according to all technically plausible combinations.

According to one or more embodiments, the first sub-system also comprises a first database distributed across at least some of the computing units in the first sub-system, configured to store and manage data and first information and/or the second sub-system further comprises a second database distributed across at least some of the computing units in the second sub-system, configured to store and manage data, first information and second information.

In this way, the first database distributed across the computing units of the first sub-system and/or the second database distributed across the computing units of the second sub-system manages a coherent view of the data and information representative of the state of the industrial process, guaranteeing no risk of temporal drift.

According to at least one embodiment compatible with the preceding one or more embodiments, the second sub-system further comprises a current time module including a plurality of computing units, each computing unit of the current time module being configured for:

replicating at least some of the data, first information, and second information from the second processing module;

providing for the second module for managing the operator stations, the replicated data, first information, and second information corresponding to the acquisition time immediately preceding the current time;

the computing units of the current time module working in functional redundancy.

Thus, the computing units of the current time module manage the data relating to the current time and therefore the modifications to be made to the display of the operator stations in the second set of operator stations in real time and thus offload the computing units of the second module for managing the operator stations. At the current time module, redundancy is provided by the plurality of computing units working in functional redundancy, that is, carrying out the same tasks simultaneously.

According to at least one embodiment compatible with the preceding one or more embodiments, the second sub-system further comprises an archiving module including a plurality of computing units, each computing unit of the archiving module being configured for:

replicating and archiving some of the data, first information, and second information from the second processing module;

providing for the second module for managing the operator stations, the archived data, first information, and second information corresponding to each acquisition time preceding the acquisition time immediately preceding the current time;

the computing units of the archiving module working in functional redundancy.

Thus, the computing units of the archiving module manage the data to be displayed not relative to the current time, that is, the archival data, and thus offload the computing units of the second module for managing the operator stations. At the archiving module, redundancy is provided by the plurality of computing units working in functional redundancy.

At least one embodiment of the invention relates to a method for operating a critical industrial process implemented by the system according to one or more embodiments of the invention, comprising the following steps, carried out for each cycle of a set of cycles:

For each computing unit of each pair of computing units of the interface module, collecting each item of data received by each controller having a corresponding controller model and eliminating each item of data received in duplicate, each item of data being associated with an acquisition time preceding a current time;

Receiving, by each computing unit of the first processing module, data collected by the interface module, sorting the received data according to their acquisition time, eliminating the duplicate received data and computing first information from an information group for each acquisition time from the corresponding sorted data, and sending to each computing unit of the separating device, each first information item computing unit;

Receiving by each computing unit of the first module for managing the operator stations, each computed first information item, and sending to each operator station in the first set of operator stations, each received first information comprised in an information subset requested by an operator;

Each computing unit of the second processing module receives the collected data and first information computed by the first sub-system, detects the data and first information modified since the previous cycle, eliminates the duplicate data and first information received and computes second information from the group of information for each acquisition time, based on the corresponding detected data and first information;

Receiving by each computing unit of the second module for managing the operator stations, each computed second information item, and sending to each operator station in the second set of operator stations, each received second information comprised in an information subset requested by an operator;

Displaying the first information from the information subset requested by each operator station in the first set of operator stations, and the second information from the information subset requested by each operator station in the second set of operator stations, at the current time;

If the operator provides an instruction via the graphical interface of an operator station in the first set of operator stations, sending the instruction to the interface module;

Sending, by the interface module, at least one command dependent on the data received and/or the instruction to at least one controller;

each step of receiving by a computing unit of the first sub-system including an exchange of at least one message between the computing unit and another computing unit of the first sub-system including the following sub-steps:

Simultaneously sending the message on the first channel and the second channel of the first communication network by the other computing unit to the first redundancy module;

Receiving, by the first redundancy module, the message sent;

If the message is received via the first channel and via the second channel, deleting by the first redundancy module the message received via the second channel;

Modifying by the first redundancy module the message received by adding an acknowledgment request;

Simultaneously disseminating the modified message on the first channel and the second channel to the computing unit by the first redundancy module;

Receiving the modified message by the computing unit and sending an acknowledgment to the first redundancy module;

each step of receiving by a computing unit of the second sub-system including an exchange of at least one message between the computing unit and another computing unit of the second sub-system including the following sub-steps:

Simultaneously sending the message on the first channel and the second channel of the second communication network by the other computing unit to the second redundancy module;

Receiving, by the second redundancy module, the message sent;

If the message is received via the first channel and via the second channel, deleting by the second redundancy module the message received via the second channel;

Modifying by the second redundancy module the message received by adding an acknowledgment request;

Simultaneously disseminating the modified message on the first channel and the second channel to the computing unit by the second redundancy module;

Receiving the modified message by the computing unit and sending an acknowledgment to the second redundancy module.

According to at least one embodiment, the method according to one or more embodiments of the invention further comprises the following steps carried out by each computing unit of the current time module:

Replicating at least some of the data, first information, and second information from the second processing module;

Sending to each computing unit of the second module for managing the operator stations, the replicated data, first information, and second information corresponding to the acquisition time immediately preceding the current time.

According to at least one embodiment compatible with the preceding one or more embodiments, the method according to the invention further comprises the following steps carried out by each computing unit of the archiving module:

Replicating and archiving at least some of the data, first information, and second information from the second processing module;

Sending to each computing unit of the second module for managing the operator stations, the archived data, first information, and second information corresponding to each acquisition time preceding the acquisition time immediately preceding the current time.

According to at least one embodiment of the invention, the step of sending by a computing unit of the second sub-system comprises an exchange of at least one message between the computing unit and at least one other computing unit of the second sub-system including the following sub-steps:

Simultaneously sending the message on the first channel and the second channel of the second communication network, by the computing unit to the second redundancy module;

Receiving, by the second redundancy module, the message sent;

If the message is received via the first channel and via the second channel, deleting by the second redundancy module the message received via the second channel;

Modifying by the second redundancy module the message received by adding an acknowledgment request;

Simultaneous disseminating the modified message on the first channel and the second channel to the other computing unit;

Receiving the modified message by the other computing unit and sending an acknowledgment to the second redundancy module.

At least one embodiment of the invention relates to a computer program product comprising instructions which, when the software is executed by a computer, enable the latter to implement the steps of the method according to one or more embodiments of the invention.

According to at least one embodiment, the computer program product is written in ADA language.

Thus, the computer program product is independent of the hardware of the computing unit on which it is implemented.

The at least one embodiment of the invention and its different applications will be better understood upon reading the following disclosure and examining the accompanying figures.

BRIEF DESCRIPTION OF THE DRAWINGS

The figures are presented by way of reference and are in no way limiting to the one or more embodiments of the invention.

DETAILED DESCRIPTION OF THE INVENTION

Unless otherwise stated, the same element appearing in different figures has the same reference.

At least one embodiment of the invention relates to a system allowing the operation or control of a critical industrial process.

"Operation of an industrial process" is understood to mean the method used to govern the operation of the industrial process.

The operation of an industrial process typically comprises features required for operation, such as data acquisition, display of information for alarm generation and decision making, and operation assistance features, such as display of information for supervision or operation sequences, and data archiving.

In the context of one or more embodiments of the invention, the predictability of response times and the reliability of processed information are guaranteed for the features required for operation.

To ensure predictability of response times, the system's behavior in relation to its environment must be established by means of a model capable of determining response times whatever the scenario.

To ensure the reliability of processed information, the system must be able to detect the absence of communications or processing for a set of information items, to avoid the risk of having information that is not refreshed, or of using erroneous or missing information due to an undetected temporal drift.

The industrial process is a critical industrial process, such as the process of managing the supply of energy by a power grid or a power generation plant.

The system according to one or more embodiments of the invention is high-availability, i.e. the features required for operation and the operation assistance features are high-availability.

"Availability" means the property of a system capable of ensuring its functions without interruption, delay or degradation, at the time the request is made.

"High-availability system" means a system capable of meeting the availability requirements over a period of time greater than about ten years.

To obtain a high-availability system, the system must be entirely redundant, that is, arranged with additional devices or functions intended to allow the resumption of operation in the event of failure or unavailability of any device or main function.

Figure 1:
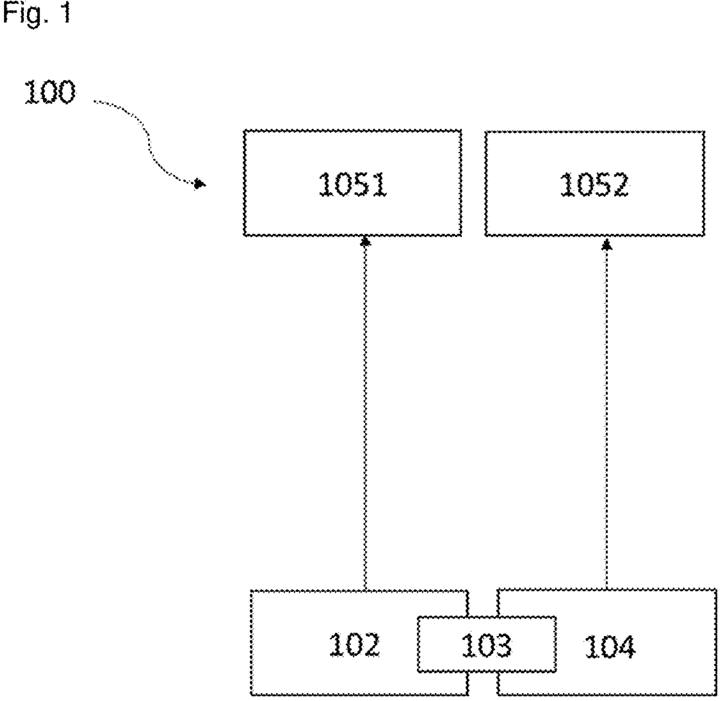
FIG. 1 shows a schematic depiction of an information system according to one or more embodiments of the invention.

FIG. 1 shows a schematic depiction of an information system 100 according to one or more embodiments of the invention.

The system 100 comprises:

- A first sub-system 102 for industrial process operation, i.e. implementing the features required for industrial process operation, thus meeting the requirements of predictability of response times, reliability of processed information and high availability;
- A second sub-system 104 for industrial process operation assistance, i.e. implementing industrial process operation assistance features, thus meeting the requirement for high availability;
- A unidirectional separating device 103, comprising a pair of computing units;
- A first set 1051 of operator stations 105 and a second set 1052 of operator stations 105, each operator station 105 comprising a graphical user interface.

To meet the requirements of response time predictability and processed information reliability, the first sub-system 102 works cyclically, i.e. the processes implemented by the first sub-system 102 are carried out in each cycle, and data is transmitted in each cycle, whether or not it has been modified between two successive cycles.

In contrast, the second sub-system 104 works in an event-driven manner, i.e. data is transmitted only when it has been modified between two successive cycles.

As shown in FIG. 1, by way of at least one embodiment, the separating device 103 is included in both the first sub-system 102 and the second sub-system 104, i.e. the pair of computing units in the separating device 103 is considered to belong to the first sub-system 102 by the other computing units in the first sub-system 102 and considered to belong to the second sub-system 104 by the other computing units in the second sub-system 104.

In particular, the separating device 103 is physically comprised in the first sub-system 102, i.e. the pair of computing units of the separating device 103 belongs to the first sub-system 102, and hosts a software part of the second sub-system 104.

The separating device 103 is unidirectional in that it can receive messages from the first sub-system 102 and send messages to the second sub-system 104, but cannot receive messages from the second sub-system 104 and send messages to the first sub-system 102.

The system 100 can also include an administration station not shown in the figures, in which an operating system is installed, and an administration module configured to manage the link between the computing units of the system 100 and the administration station, that is, to form the interface between the system 100 and the administration station.

The administration station is distinct from the operator stations 105.

Figure 2:
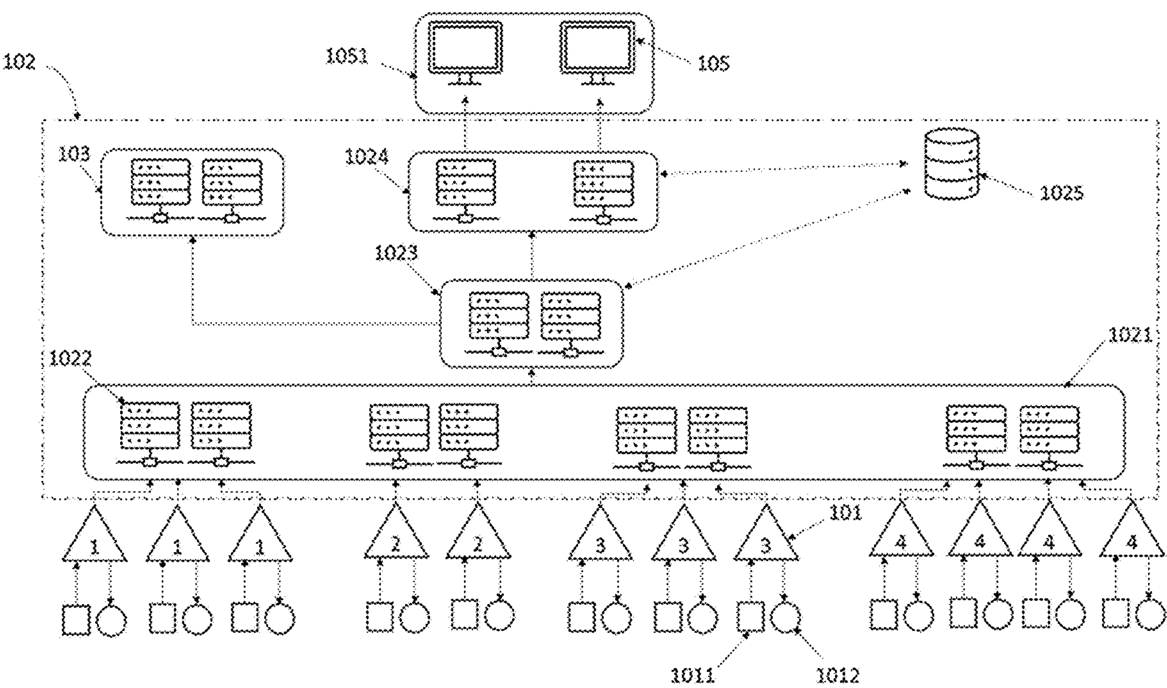
FIG. 2 shows a schematic depiction of a first sub-system of the system according to one or more embodiments of the invention.

FIG. 2 shows a schematic depiction of the first sub-system 102 of the system 100 according to one or more embodiments of the invention.

The first sub-system 102 comprises:

An interface module 1021;

A first processing module 1023 comprising a pair of computing units 1022;

A module for managing the operator stations 1024 comprising one computing unit 1022 per operator station 105 in the first set 1051 of operator stations 105.

The interface module 1021 is configured to interface with a plurality of high-availability programmable industrial controllers 101, each having a controller model. The interface module 1021 comprises at least one pair of computing units 1022 for each controller model.

In FIG. 2, by way of at least one embodiment, the first sub-system 102 interfaces with twelve controllers 101 represented by triangles, three controllers 101 having a controller model 1, two controllers 101 having a controller model 2, three controllers 101 having a controller model 3 and four controllers 101 having a controller model 4.

In FIG. 2, by way of at least of embodiment, the interface module 1021 comprises a pair of computing units per controller model, that is, a first pair of computing units 1022 interfacing with the controllers 101 having the controller model 1, a second pair of computing units 1022 interfacing with the controllers 101 having the controller model 2, a third pair of computing units 1022 interfacing with the controllers 101 having the controller model 3 and a fourth pair of computing units 1022 interfacing with the controllers 101 having the controller model 4.

The interface module 1021 could include a plurality of pairs of computing units 1022 per controller model.

Each controller 101 communicates with at least one sensor 1011 and at least one actuator 1012.

In FIG. 2, twelve sensors 1011 represented by squares and twelve actuators 1012 represented by circles can be seen and each controller 101 communicates with a sensor 1011 and an actuator 1012.

Each controller 101 could communicate with a plurality of sensors 1011 and/or a plurality of actuators 1012.

In FIG. 2, the first set 1051 of operator stations 105 comprises two operator stations 105, therefore the first module for managing the operator stations 1024 includes two computing units 1022.

The computing units 1022 of the interface module 1021 work in asynchronous redundancy, that is, each computing unit 1022 of a pair of computing units 1022 carries out the same tasks as the other computing unit 1022 of the pair of computing units 1022 without synchronization between them and each pair of computing units 1022 carries out the same tasks as the other pairs of computing units 1022 without synchronization between them.

The pair of computing units 1022 of the first processing module 1023 work in active redundancy, that is, each computing unit 1022 carries out the same tasks as the other computing unit 1022 in total synchronization but only one of the two computing units 1022 communicates results to the rest of the system 100.

Figure 7:
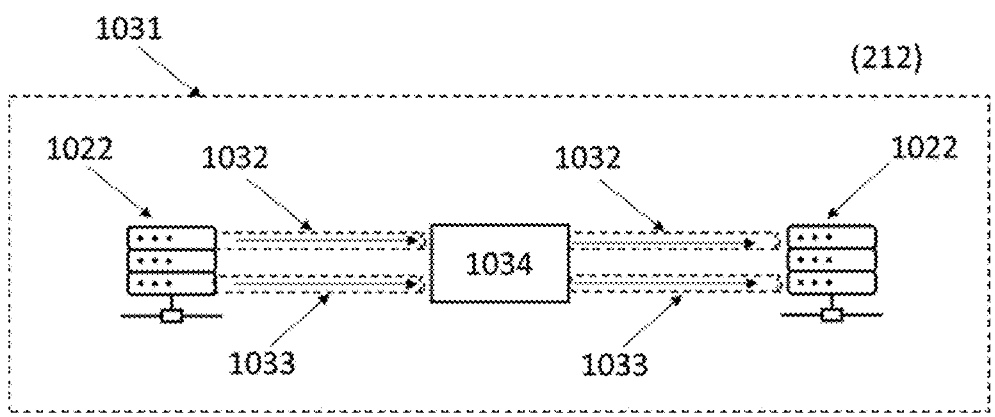
FIG. 7 shows a schematic representation of the exchange of a message between a computing unit and at least one other computing unit of the first sub-system of the system according to one or more embodiments of the invention.

FIG. 7 shows a schematic representation of the operation of communications between computing units 1022 within the first sub-system 102, according to one or more embodiments of the invention.

The first sub-system 102 includes a dual first communication network 1031 having a first channel 1032 and a second channel 1033 independent of one another and including a first redundancy module 1034 distributed over the computing units 1022 of the first sub-system 102.

The first communication network 1031 is for example a dual Ethernet network.

The first sub-system 102 may also comprise a first database 1025 distributed over at least some of the computing units 1022 of the first sub-system 102.

In FIG. 2, the first database 1025 is distributed over the computing units 1022 of the first processing module 1023 and over the computing units 1022 of the first module for managing the operator stations 1024, but the first database 1025 could also be distributed over other computing units 1022, for example over the computing units 1022 of the interface module 1021.

The first database 1025 may also be distributed over all the computing units 1022 of the first sub-system 102.

Figure 3:
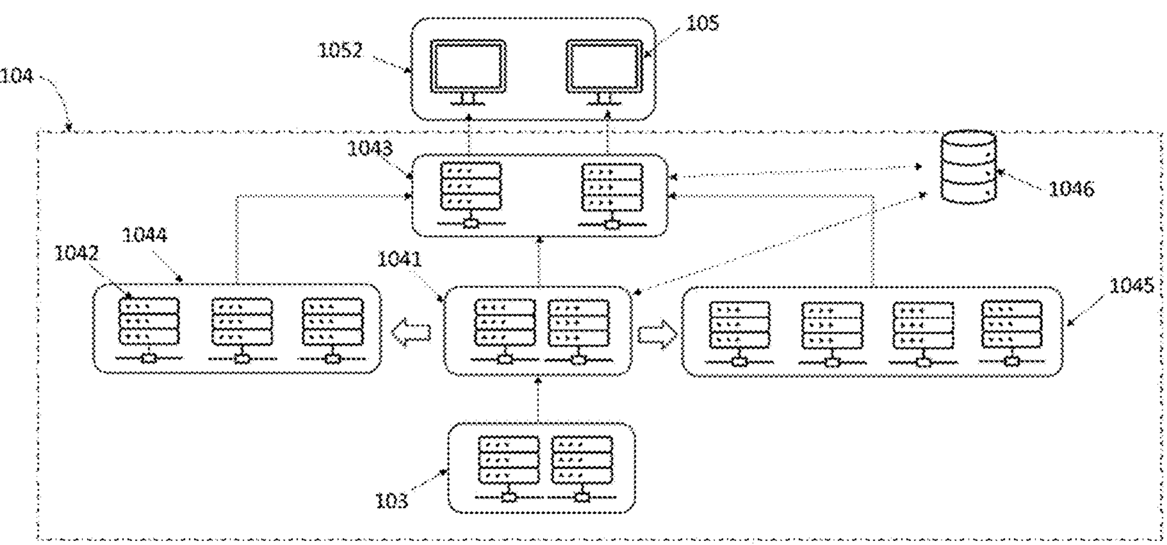
FIG. 3 shows a schematic depiction of a second sub-system of the system according to one or more embodiments of the invention.

FIG. 3 shows a schematic depiction of the second sub-system 104 of the system 100 according to one or more embodiments of the invention.

The second sub-system 104 comprises:

A second processing module 1041 comprising a pair of computing units 1042;

A second module for managing the operator stations 1043 comprising one computing unit 1042 per operator station 105 in the second set 1052 of operator stations 105.

In FIG. 3, by way of at least one embodiment, the second set 1052 of operator stations 105 comprises two operator stations 105, therefore the second module for managing the operator stations 1043 includes two computing units 1042.

The pair of computing units 1042 of the second processing module 1041 works in active redundancy.

Figure 9:
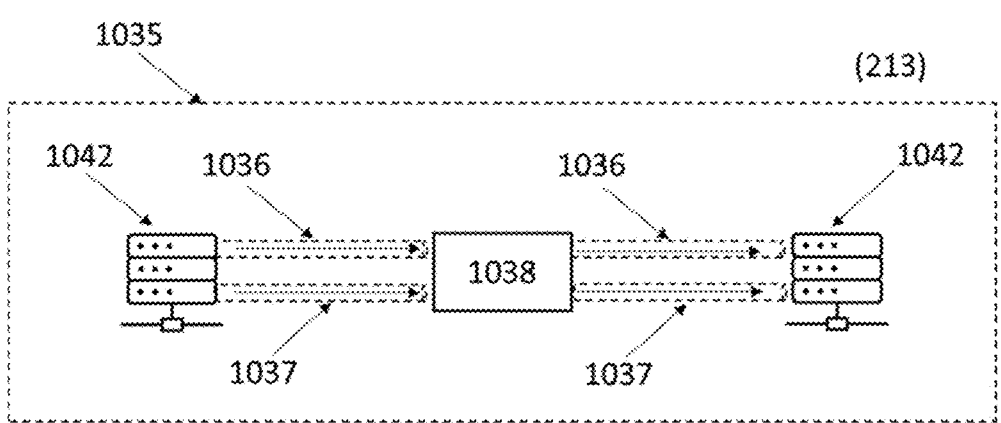
FIG. 9 shows a schematic representation of the exchange of a message between a computing unit and at least one other computing unit of the second sub-system of the system according to one or more embodiments of the invention.

FIG. 9 shows a schematic representation of the operation of communications between computing units 1042 within the second sub-system 104, according to one or more embodiments of the invention.

The second sub-system 104 includes a dual second communication network 1035 having a first channel 1036 and a second channel 1037 independent of one another and comprising a second redundancy module 1038 distributed over the computing units 1042 of the second sub-system 104.

The second communication network 1035 is for example a dual Ethernet network.

The second sub-system 104 may also comprise:

A second database 1046 distributed over at least a portion of the computing units 1042 in the second sub-system 104;

A current time module 1044 including a plurality of computing units 1042;

An archiving module 1045 including a plurality of computing units 1042.

In FIG. 3, by way of at least one embodiment, the second database 1046 is distributed over the computing units 1042 of the second processing module 1041 and over the computing units 1042 of the second module for managing the operator stations 1043, but the second database 1046 could also be distributed over other computing units 1042.

The second database 1046 may also be distributed over all the computing units 1042 of the second sub-system 104.

The second database 1046 may also be distributed over the computing units 1042 of the current time module 1044 and/or over the computing units 1042 of the archiving module 1045.

The computing units 1042 of the current time module 1044 work in functional redundancy, that is, the tasks are carried out simultaneously by each computing unit 1042 of the current time module 1044.

The computing units 1042 of the archiving module 1045 work in functional redundancy.

In FIG. 3, the current time module 1044 includes three computing units 1042, but it could include any other number of computing units 1042.

In FIG. 3, the archiving module 1045 includes four computing units 1042, but it could include any other number of computing units 1042.

At least one embodiment of the invention relates to a method for operating a critical industrial process implemented by the system 100 according to one or more embodiments of the invention.

Figure 4:
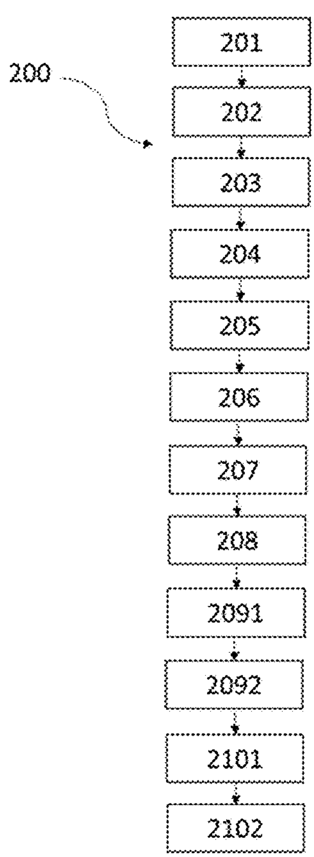
FIG. 4 is a block diagram showing the sequence of steps of a method according to one or more embodiments of the invention.

FIG. 4 is a block diagram showing the sequence of steps of the method 200 according to one or more embodiments of the invention.

A first step 201 of the method 200 consists, for each computing unit 1022 of each pair of computing units 1022 of the interface module 1021, in collecting a plurality of data from each controller 101 having the same controller model associated with the pair of computing units 1022 and eliminating any data received in duplicate, each item of data being associated with an acquisition time preceding a current time.

Since the first sub-system 102 works cyclically, the first data collection step 201 is carried out cyclically, i.e. at each cycle of a set of cycles.

Figure 5:
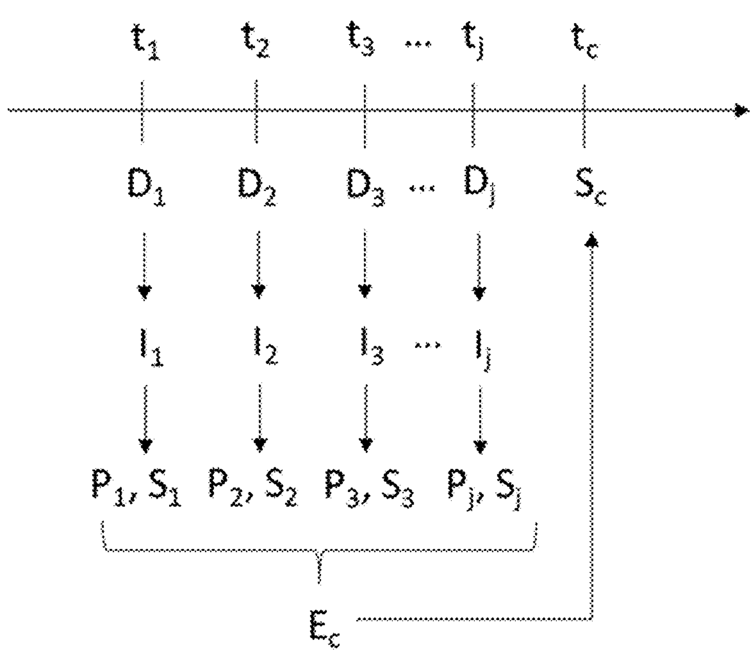
FIG. 5 shows the acquired data and the information computed by the method according to one or more embodiments of the invention as a function of time.

FIG. 5 shows the data $D_1$ acquired as a function of time, according to one or more embodiments of the invention.

In FIG. 5, at least one first item of data $D_1$ is associated with a first acquisition time $t_1$, at least one second item of data $D_2$ is associated with a second acquisition time $t_2$, at least one third item of data $D_3$ is associated with a third acquisition time $t_3$ and at least one $j^{th}$ data $D_j$ is associated with a $j^{th}$ acquisition time $t_i$, the $j^{th}$ acquisition time $t_j$ being the last acquisition time preceding the current time $t_c$.

The time interval between two successive acquisition times may be fixed or variable.

For example, a first controller 101 receives the first item of data $D_1$ and the third item of data $D_3$ and a second controller 101 receives the second item of data $D_2$ and the $j^{th}$ item of data $D_j$. If the first controller 101 has a first controller model and the second controller 101 has a second controller model, a first pair of computing units 1022 of the interface module 1021 collects the first item of data $D_1$ and the third item of data $D_3$ and a second pair of computing units 1022 of the interface module 1021 collects the second item of data $D_2$ and the $j^{th}$ item of data $D_j$.

Taking the example of FIG. 2, by way of at least one embodiment, the first step 201 consists, for each cycle, for the first pair of computing units 1022 of the interface module 1021, in collecting the data $D_i$ received by each controller 101 having the model 1 controller, for the second pair of computing units 1022 of the interface module 1021 in collecting the data $D_i$ received by each controller 101 having the model 2 controller, for the third pair of computing units 1022 of the interface module 1021 in collecting the data $D_i$ received by each controller 101 having the model 3 controller and for the fourth pair of computing units 1022 of the interface module 1021 in collecting the data $D_i$ received by each controller 101 having the model 4 controller.

Each computing unit 1022 of the interface module 1021 collects for example each item of data $D_i$ received by each controller 101 at a collection time immediately following the acquisition time $t_i$, that is to say the transmission of the data $D_i$ is carried out in real time between each controller 101 and each computing unit 1022 of the interface module 1021.

A second step 202 of the method 200 consists, for each computing unit 1022 of the first processing module 1023, in receiving the data Di collected by the interface module 1021 in the first step 201, that is, in receiving all the data Di collected by the interface module 1021.

Returning to the previous example, each computing unit 1022 of the first processing module 1021 for example receives the first item of data $D_1$ and the third item of data $D_3$ from the first pair of computing units 1022 and the second item of data $D_2$ and the $j^{th}$ item of data $D_j$ from the second pair of computing units 1022.

Each computing unit 1022 of the first processing module 1023 receives for example each item of data $D_i$ collected at a reception time immediately following the collection time, that is, the transmission of the data $D_i$ is carried out in real time between each computing unit 1022 of the first processing module 1023 and each computing unit 1022 of the interface module 1021.

The second step 202 then consists, for each computing unit 1022 of the first processing module 1023, in sorting the data $D_i$ received as a function of their acquisition time $t_i$, that is, in chronologically ordering the data $D_i$ received, then eliminating the duplicate $D_i$ data received.

Returning to the example of FIG. 5, by way of at least one embodiment, each computing unit 1022 of the first processing module 1023 sorts the data $D_i$ received in the following order: the first item of data $D_1$, the second item of data $D_2$, the third item of data $D_3$ and the $j^{th}$ item of data $D_j$.

Finally, the second step 202 consists, for each computing unit 1022 of the first processing module 1023, in computing, for each acquisition time $t_i$, first information $P_i$ of an information group $I_i$ from the corresponding sorted data $D_1$, and in sending each computed first information item $P_i$ to each computing unit 1022 of the separating device 103.

Each information group $I_i$ comprises a plurality of information items $I_i$, each one depending on at least one item of data $D_1$ acquired at the acquisition time $t_i$. For example, an item of information $I_i$ may depend on an item of data acquired at the acquisition time $t_1$ and on the same item of data acquired at the acquisition time $t_{i-1}$ immediately preceding the acquisition time $t_i$.

Each information group $I_i$ comprises a plurality of first information items $P_i$ for operating the industrial process and a plurality of second information items $S_i$ for assisting the operation of the industrial process.

By taking the example of FIG. 5, the second step 202 consists in computing the first information $P_1$ from a first information group $I_1$ for the first acquisition time $t_1$, the first information $P_2$ from a second information group $I_2$ for the second acquisition time $t_2$, the first information $P_3$ from a third information group $I_3$ for the third acquisition time $t_3$ and a $j^{th}$ information group $I_j$ for the $j^{th}$ acquisition time $t_j$.

Since the first sub-system 102 works cyclically, the second step 202 of receiving and sorting the collected data $D_i$, and computing and sending the first information $P_i$, is carried out cyclically, i.e. in each cycle, the data $D_i$ is received and sorted, and the first information $P_i$ is computed and sent to the separating device 103.

A third step 203 of the method 200 consists, for each computing unit 1022 of the first module for managing the operator stations 1024, in receiving each first information item $P_i$ computed in the second step 202.

Taking FIG. 5 as an example, the third step 203 consists, for each computing unit 1022 of the first operator station management module 1024, in receiving the first information $P_1$ from the first information group $_{I1}$, the first information $P_2$ from the second information group $I_2$, the first information $P_3$ from the third information group $I_3$ and the first information $P_j$ from the $j^{th}$ information group $I_j$.

Each computing unit 1022 of the first module for managing the operator stations 1024 receives for example the first information $P_i$ computed at a reception time immediately following a computing time of the first information $P_i$, that is to say the transmission of the first information $P_i$ is carried out in real time between each computing unit 1022 of the first processing module 1023 and each computing unit 1022 of the first module for managing the operator stations 1024.

The third step 203 of the method 200 then consists, for each computing unit 1022 of the first module for managing the operator stations 1024, in sending to the corresponding operator station 105 in the first set 1051 of operator stations 105, each first information item $P_i$ received that is comprised in a subset of information Sc requested by an operator.

The information subset Sc comprises at least part of the information $I_3$ comprised in an information set Ec comprising each computed information group $I_3$.

Each computing unit 1022 of the first module for managing the operator stations 1024 sends, for example, each first information item $P_i$ at a sending time immediately following the time of reception of the first information item $P_i$, that is to say, the transmission of the first information $P_i$ is carried out in real time between each computing unit 1022 of the first module for managing the operator stations 1024 and each operator station 105.

Since the first sub-system 102 works cyclically, the third step 203 of receiving and sending the first computed information $P_i$ included in the information set $E_c$ is carried out cyclically, i.e. at each cycle, the first information $P_i$ is received and sent to the operator stations 105 of the first set 1051 of operator stations 105.

A fourth step 204 of the method 200 consists, for each computing unit 1042 of the second processing module 1041, in receiving the data $D_i$ collected and the first information $P_i$ computed by the first processing module 1023 in the second step 202 of each computing unit 1022 of the separating device 103 and in detecting the data $D_i$ collected and the first information $P_i$ computed by each computing unit 1022 of the first processing module 1023 modified between two successive cycles, which corresponds to working in an event-driven manner.

Taking FIG. 5 as an example, by way of at least one embodiment, the fourth step 204 consists in each cycle, for each computing unit 1042 of the second processing module 1041, in receiving the first data item $D_1$ and the first information $P_1$ of the first information group $I_1$, the second data item $D_2$ and the first information $P_2$ of the second information group $I_2$, the third data item $D_3$ and the first information $P_3$ of the third information group $I_3$ and the $j^{th}$ data item $D_j$ and the first information $P_j$ of the $j^{th}$ information group $I_j$, and to detect, among the data $D_i$ and the first information $P_i$ received, those which have been modified since the previous cycle.

Each computing unit 1042 of the second processing module 1041 receives for example each collected data item $D_i$ and each computed first information item $P_i$ at a reception time immediately following a compute time of the first information $P_i$, that is, the transmission of the data $D_i$ is carried out in real time between each computing unit 1022 of the first processing module 1023 and each computing unit 1042 of the second processing module 1041.

The fourth step 204 then consists in eliminating the duplicate data $D_i$ data and first information $P_i$ received.

Finally, for each computing unit 1042 of the second processing module 1041, the fourth step 204 consists in computing for each acquisition time $t_1$, the second information $S_i$ of the corresponding information group $I_i$, from the corresponding data $D_i$ and first information $P_i$ received.

Taking the example of FIG. 5, by way of at least one embodiment, the fourth step 204 consists in computing the second information $S_i$ from the first information group $I_1$ for the first acquisition time $t_1$, the second information $S_2$ from the second information group $I_2$ for the second acquisition time $t_2$, the second information $S_3$ from the third information group $I_3$ for the third acquisition time $t_3$, and the second information $S_j$ from the $j^{th}$ information group $I_j$ for the $j^{th}$ acquisition time $t_j$.

Since the second sub-system 104 works in an event-driven manner, at each cycle, in the fourth step 204, only the second information si dependent on at least one data item $D_i$ and/or on at least one first information item $P_i$ detected, i.e. modified since the previous cycle, are computed.

A fifth step 205 of the method 200 consists, for each computing unit 1042 of the second module for managing the operator stations 1043, in receiving each second information item $S_i$ computed in the fourth step 204.

Taking FIG. 5 as an example, by way of at least one embodiment, the fifth step 205 consists, for each computing unit 1042 of the second operator station management module 1043, in receiving the second information $S_1$ from the first information group I1, the second information $S_2$ from the second information group I2, the second information $S_3$ from the third information group $I_3$ and the second information $S_j$ from the $j^{th}$ information group $I_j$.

Each computing unit 1042 of the second module for managing the operator stations 1043 receives for example each second information item $S_i$ computed at a reception time immediately following a computing time of the second information $S_i$, that is to say the transmission of the second information $S_i$ is carried out in real time between each computing unit 1042 of the second processing module 1041 and each computing unit 1042 of the second module for managing the operator stations 1043.

The fifth step 205 of the method 200 then consists, for each computing unit 1042 of the second module for managing the operator stations 1043, in sending to the corresponding operator station 105 in the second set 1052 of operator stations 105, each second information item $S_i$ received that is comprised in the subset of information Sc requested.

Each computing unit 1042 of the second module for managing the operator stations 1043 sends, for example, each second information item $S_i$ at a sending time immediately following the time of reception of the second information item $S_i$, that is to say, the transmission of the second information $S_i$ is carried out in real time between each computing unit 1042 of the second module for managing the operator stations 1043 and each operator station 105.

Since the second sub-system 104 works in an event-driven manner, in the fifth step 205 of each cycle only the second information $S_i$ computed in the fourth step 204 is received and sent to the operator stations 105 in the second set 1052 of operator stations 105, i.e. only the second information $S_i$ dependent on at least one data item $D_1$ and/or on at least one first information item $P_i$ detected in the fourth step 204 is received and sent to the operator stations 105 in the second set 1052 of operator stations 105.

A sixth step 206 of the method 200 consists, for each operator station 105 in the first set 1051 of operator stations 105, in displaying the first information $P_i$ comprised in the information subset Sc requested at the current time to, and for each operator station 105 in the second set 1052 of operator stations 105, in displaying the second information $S_i$ comprised in the information subset Sc requested at the current time $t_c$.

A seventh step 207 of the method 200 is carried out if the operator supplies an instruction via the graphical interface of a given operator station 105 in the first set 1051 of operator stations 105.

The seventh step 207 consists in the interface module 1021 receiving the instruction.

In the seventh step 207, the given operator station 105 sends the instruction to the first operator station management module 1024, which sends the instruction to the first processing module 1023, which sends the instruction to the interface module 1021.

An eighth step 208 of the method 200 consists, for the interface module 1021, in sending at least one command dependent on the data $D_i$ received at the first step 201 and/or the instruction received in the seventh step 207 to at least one controller 101.

The controller 101 can then send the command to at least one corresponding actuator 1012.

The command may therefore depend on the information $I_i$ computed from the data $D_i$ received.

For example, in one or more embodiments, if the interface module 1021 receives at the seventh step 207 an instruction requesting to switch off an actuator 1012 *i*, the eighth step 208 consists in the interface module 1021 sending a command to the controller 101 *j* configured to send commands to the actuator 1012 *i*.

In the case where the second sub-system 104 comprises the current time module 1044, the method 200 comprises a ninth step 2091 and a tenth step 2092 carried out by each computing unit 1042 of the current time module 1044.

The ninth step 2091 consists of replicating at least some of the data $D_i$, first information $P_i$ and second information $S_i$ from the second processing module 1041, i.e. some of the data $D_i$, first information $P_i$ and second information $S_i$ from the second processing module 1041 or all of the data $D_i$, first information $P_i$ and second information $S_i$ from the second processing module 1041.

"Replication" means sharing information to ensure consistency of data among several redundant data sources.

Part of the replicated data $D_i$, first information $P_i$ and second information $S_i$ from the second processing module 1041 comprises, for example, the data $D_i$, first information $P_i$ and second information $S_i$ relating to the acquisition time $t_j$ immediately preceding the current time $t_c$.

The tenth step 2092 consists in sending to each computing unit 1042 of the second module for managing the operator stations 1043, the data, first information $P_i$ and second information $S_i$ replicated at the ninth step 2091 relating to the acquisition time $t_j$ immediately preceding the current time $t_c$.

In the case where the system 104 comprises the archiving module 1045, the method 200 comprises an eleventh step 2101 and a twelfth step 2102 carried out by each computing unit 1042 of the archiving module 1045.

The eleventh step 2101 consists of replicating and archiving at least some of the data $D_i$, first information $P_i$ and second information $S_i$ from the second processing module 1041, i.e. some of the data $D_i$, first information $P_i$ and second information $S_i$ from the second processing module 1041 or all of the data $D_i$, first information $P_i$ and second information $S_i$ from the second processing module 1041.

Part of the archived data $D_1$, first information $P_i$ and second information $S_i$ from the second processing module 1041 comprises, for example, the data $D_i$, first information $P_i$ and second information $S_i$ relating to each acquisition time $t_i$ preceding the acquisition time $t_j$ immediately preceding the current time $t_c$.

The twelfth step 2102 consists in sending to each computing unit 1042 of the second module for managing the operator stations 1043, the data $D_i$ and the first information $P_i$ and second information $S_i$ archived in the eleventh step 2101 relating to each acquisition time $t_i$ preceding the acquisition time $t_j$ immediately preceding the current time $t_c$.

In FIG. 5, by way of at least one embodiment, the acquisition time $t_i$ immediately preceding the current time $t_c$ is the $j^{th}$ acquisition time $t_j$ therefore the twelfth step 2102 consists in sending the data $D_i$, first information $P_i$, and second information $S_i$ relating to the first acquisition time $t_1$, at the second acquisition time $t_2$, at the third acquisition time $t_3$ and in general at all the other acquisition times $t_i$ preceding the $j^{th}$ acquisition time $t_j$.

In the method 200, each step of receiving by a computing unit 1022 of the first sub-system 102, that is, the second step 202 and the third step 203, comprises an exchange 212 of at least one message between a sending computing unit 1022 and at least one other recipient computing unit 1022.

Figure 6:
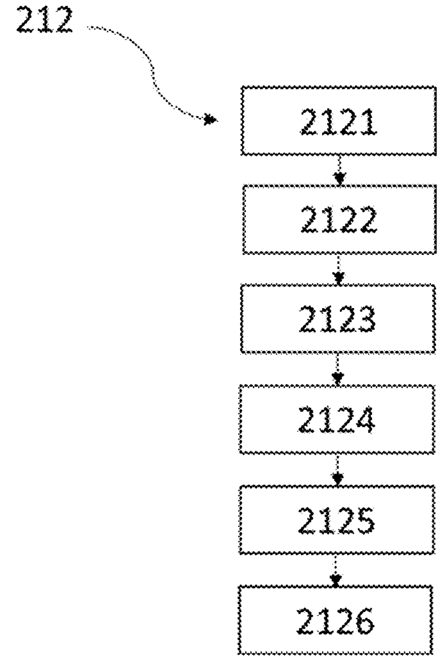
FIG. 6 is a block diagram illustrating the sequence of the sub-steps of a step of the method according to one or more embodiments of the invention including the exchange of a message between a computing unit and at least one other computing unit of the first sub-system of the system according to one or more embodiments of the invention.

FIG. 6 is a block diagram showing the sequence of sub-steps of an exchange 212, according to one or more embodiments of the invention.

A first sub-step 2121 of the exchange 212 consists in the sending computing unit 1022 sending the message simultaneously on the first channel 1032 and the second channel 1033 of the first communication network 1031 to the first redundancy module 1034.

A second sub-step 2122 of the exchange 212 consists in the first redundancy module 1034 receiving the message sent.

If in the second sub-step 2122, the first redundancy module 1034 receives the message via the first channel 1032 and via the second channel 1033 of the first communication network 1031, and therefore receives the duplicate message, a third sub-step 2123 of the exchange 212 consists in the first redundancy module 1034 deleting the message received via the second channel 1033.

A fourth sub-step 2124 of the exchange 212 consists in the first redundancy module 1034 modifying the message received by adding an acknowledgment request.

A fifth sub-step 2125 of the exchange 212 consists in the first redundancy module 1034 disseminating the modified message simultaneously on the first channel 1032 and the second channel 1033 of the first communication network 1031 to the recipient computing unit(s) 1022.

A sixth sub-step 2126 of the exchange 212 consists in each recipient computing unit 1022 receiving the modified message and sending an acknowledgment to the first redundancy module 1034.

In the method 200, the fifth step 205 of reception by a computing unit 1042 of the second sub-system 104 and each step of sending by a computing unit 1042 of the second sub-system 104, i.e. the tenth step 2092 and the twelfth step 2102, comprises an exchange 213 of at least one message between a sending computing unit 1042 and at least one other recipient computing unit 1042.

Figure 8:
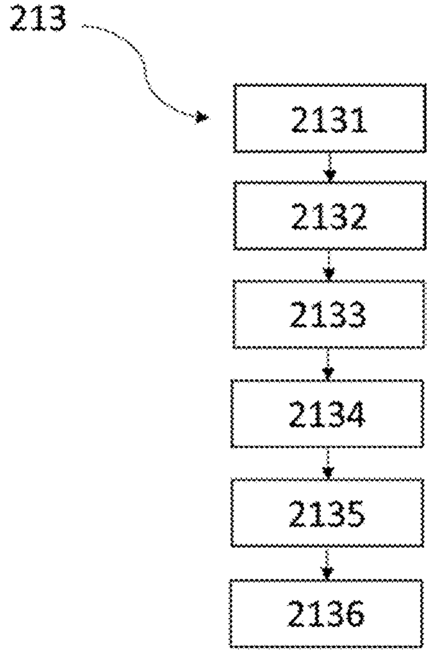
FIG. 8 is a block diagram illustrating the sequence of the sub-steps of a step of the method according to one or more embodiments of the invention including the exchange of a message between a computing unit and at least one other computing unit of the second sub-system of the system according to one or more embodiments of the invention.

FIG. 8 is a block diagram showing the sequence of sub-steps of an exchange 213, according to one or more embodiments of the invention.

A first sub-step 2131 of the exchange 213 consists in the sending computing unit 1042 sending the message simultaneously on the first channel 1036 and the second channel 1037 of the second communication network 1035 to the second redundancy module 1038.

A second sub-step 2132 of the exchange 213 consists in the second redundancy module 1038 receiving the message sent.

If in the second sub-step 2132, the second redundancy module 1038 receives the message via the first channel 1036 and via the second channel 1037 of the second communication network 1035, and therefore receives the duplicate message, a third sub-step 2133 of the exchange 213 consists in the second redundancy module 1038 deleting the message received via the second channel 1037.

A fourth sub-step 2134 of the exchange 213 consists in the second redundancy module 1038 modifying the message received by adding an acknowledgment request.

A fifth sub-step 2135 of the exchange 213 consists in the second redundancy module 1038 disseminating the modified message simultaneously on the first channel 1036 and the second channel 1037 of the second communication network 1035 to the recipient computing unit(s) 1042.

A sixth sub-step 2136 of the exchange 213 consists in each recipient computing unit 1042 receiving the modified message and sending an acknowledgment to the second redundancy module 1038.

The first database 1025 is configured to store and manage the data $D_i$ and first information $P_i$ used by the computing units 1022 on which it is distributed.

The second database 1046 is configured to store and manage the data $D_i$, first information $P_i$, and second information $S_i$ used by the computing units 1042 on which it is distributed.

The invention claimed is:

1. A system that operates and assists with operation of a critical industrial process, comprising:

a first set of operator stations each comprising a graphical interface and each being configured to receive instructions from an operator via the graphical interface;

display, at a current time and on request from the operator, first information from a subset of information, the subset of information being comprised in a set of information comprising a group of information for each acquisition time from among a plurality of acquisition times preceding the current time, each group of information comprising first information for operating the critical industrial process and second information for assisting with the operation of the critical industrial process;

a second set of operator stations, each configured to display, at the current time and on request from the operator, the second information from the subset of information;

a first sub-system that operates the critical industrial process working cyclically, a second sub-system that assists with the operation of the critical industrial process working in an event-driven manner, and a unidirectional separating device comprised in the first sub-system and in the second sub-system, comprising a pair of computing units, the first sub-system comprising an interface module configured to collect data from a plurality of programmable logic controllers each having a controller model, each item of data being associated with an acquisition time from the plurality of acquisition times, the interface module including at least one pair of computing units for each controller model, each computing unit of the pair of computing units being configured to collect each item of data received by each controller having the controller model and eliminating each duplicate data received;

send to at least one controller, one or more of at least one data dependent command collected and instructions provided by the operator;

the computing units of the interface module working in asynchronous redundancy;

a first processing module including a pair of computing units, each computing unit of the pair of computing units being configured to receive the data collected from each computing unit of the interface module;

sort the data received as a function of their acquisition time and eliminating the each duplicate data that is received;

compute for each acquisition time, the first information of the group of information corresponding thereto, from the data that is sorted and corresponding thereto;

send to each computing unit of the unidirectional separating device, each first information item computed;

the computing units of the first processing module working in active redundancy;

a first module that manages the operator stations of the first set of operator stations, comprising one computing unit for each operator station in the first set of operator stations, each computing unit being configured to receive each first information item computed;

send to the each operator station corresponding thereto each first information item corresponding to the subset of information requested;

manage the graphical interface of the each operator station corresponding thereto;

a first duplicate communication network having a first channel and second channel that are separate, comprising a first redundancy module distributed over each computing unit of the first sub-system, each computing unit of the first sub-system being configured to send to the first redundancy module each message intended for at least one other computing unit of the first sub-system simultaneously on the first channel and the second channel;

receive each message intended for it from the first redundancy module and sending an acknowledgment to the first redundancy module;

the first redundancy module being configured to receive the each message sent via one or more of the first channel and the second channel;

delete the each message received via the second channel if the each message has been received via the first channel;

modify the each message that is received by adding an acknowledgment request;

disseminate the each message that is modified to said at least one other computing unit of the first sub-system simultaneously on the first channel and the second channel;

the second sub-system comprising a second processing module comprising a pair of computing units, each computing unit of the pair of computing units being configured to receive from each computing unit of the unidirectional separating device, the data that is collected and the first information that is computed;

eliminate any duplicate data and first information received;

compute, for each acquisition time, the second information of the group of information corresponding thereto, from the data that is sorted and the first information corresponding thereto;

the computing units of the second processing module working in active redundancy;

a second module that manages the operator stations of the second set of operator stations, comprising one computing unit for each operator station in the second set of operator stations, each computing unit being configured to receive each computed second information item;

send to the each operator station corresponding thereto each second information item corresponding to the subset of information requested;

manage the graphical interface of the each operator station corresponding thereto;

a second duplicate communication network having a first channel and second channel that are separate, comprising a second redundancy module distributed over each computing unit of the second sub-system, each computing unit of the second sub-system being configured to send to the second redundancy module each message intended for at least one other computing unit of the second sub-system simultaneously on the first channel and the second channel;

receive each message intended for it from the second redundancy module and sending an acknowledgment to the second redundancy module;

the second redundancy module being configured to receive the each message sent via one or more of the first channel and the second channel;

delete the each message that is received via the second channel if the each message has been received via the first channel;

modify the each message that is received by adding an acknowledgment request;

disseminate the each message that is modified to the at least one other computing unit of the second sub-system simultaneously on the first channel and the second channel.

2. The system according to claim 1, wherein one or more of the first sub-system further comprises a first database distributed across at least some of the computing units of the first sub-system, configured to store and manage the data and the first information, and the second sub-system further comprises a second database distributed across at least some of the computing units of the second sub-system, configured to store and manage the data, the first information and the second information.

3. The system according to claim 1, wherein the second sub-system further comprises a current time module comprising a plurality of computing units, each computing unit of the current time module being to replicate at least some of the data, the first information and the second information of the second processing module;

provide the second module to manage the operator stations with the data that is replicated, the first information, and the second information corresponding to the acquisition time immediately preceding the current time;

the computing units of the current time module working in functional redundancy.

4. The system according to claim 1, wherein the second sub-system further comprises an archiving module comprising a plurality of computing units, each computing unit of the archiving module being configured to replicate and archive some of the data, the first information and the second information of the second processing module;

provide the second module to manage the operator stations with the data that is archived, the first information, and the second information corresponding to each acquisition time preceding the acquisition time immediately preceding the current time;

the computing units of the archiving module working in functional redundancy.

5. A method for operating a critical industrial process implemented by a system that operates and assists with operation of the critical industrial process, said system comprising a first set of operator stations each comprising a graphical interface and each being configured to receive instructions from an operator via the graphical interface;

display, at a current time and on request from the operator, first information from a subset of information, the subset of information being comprised in a set of information comprising a group of information for each acquisition time from among a plurality of acquisition times preceding the current time, each group of information comprising first information for operating the critical industrial process and second information for assisting with the operation of the critical industrial process;

a second set of operator stations, each configured to display, at the current time and on request from the operator, the second information from the subset of information;

a first sub-system that operates the critical industrial process working cyclically, a second sub-system that assists with the operation of the critical industrial process working in an event-driven manner, and a unidirectional separating device comprised in the first sub-system and in the second sub-system, comprising a pair of computing units, the first sub-system comprising an interface module configured to collect data from a plurality of programmable logic controllers each having a controller model, each item of data being associated with an acquisition time from the plurality of acquisition times, the interface module including at least one pair of computing units for each controller model, the computing units of the interface module working in asynchronous redundancy;

a first processing module including a pair of computing units, the computing units of the first processing module working in active redundancy;

a first module that manages the operator stations of the first set of operator stations, comprising one computing unit for each operator station in the first set of operator stations, each computing unit being configured to manage the graphical interface of the each operator station corresponding thereto;

a first duplicate communication network having a first channel and second channel that are separate, comprising a first redundancy module distributed over each computing unit of the first sub-system, the second sub-system comprising a second processing module comprising a pair of computing units, the computing units of the second processing module working in active redundancy;

a second module that manages the operator stations of the second set of operator stations, comprising one computing unit for each operator station in the second set of operator stations, each computing unit being configured to manage the graphical interface of the each operator station corresponding thereto;

a second duplicate communication network having a first channel and second channel that are separate, comprising a second redundancy module distributed over each computing unit of the second sub-system;

said method carried out for each cycle of a set of cycles and comprising:

for said each computing unit of said each pair of computing units of the interface module, collecting each item of data that is received by each controller having a corresponding controller model, and eliminating each duplicate data that is received, each item of data being associated with an acquisition time preceding the current time;

receiving, by said each computing unit of the processing module, said data that is collected by the interface module, sorting the data that is received as a function of their acquisition time, eliminating the each duplicate data that is received, computing the first information of the group of information corresponding thereto for said each acquisition time from the data that is sorted and corresponding thereto, and sending to each computing unit of the unidirectional separating device, each first information item that is computed;

receiving, by said each computing unit of the first module that manages the operator stations of the first set of operator stations, each first information item that is computed, and sending to said each operator station in the first set of operator stations, each first information item that is received comprised in the subset of information that is requested by the operator;

receiving, by said each computing unit of the second processing module, the data that is collected and the first information that is computed by the first sub-system, detecting the data and the first information modified since a previous cycle, eliminating any duplicate data and the first information received, and computing of the second information of the group of information for said each acquisition time, from the data that is detected and corresponding thereto and the first information;

receiving, by said each computing unit of the second module that manages the operator stations of the second set of operator stations, each computed second information item, and sending to said each operator station in the second set of operator stations, each second information item that is received and comprised in the subset of information subset requested;

displaying the first information of the subset of information requested by said each operator station of the first set of operator stations and of the second information of the subset of information requested by said each operator station of the second set of operator stations, at the current time;

if the operator provides an instruction via the graphical interface of an operator station in the first set of operator stations, sending the instruction to the interface module;

sending to at least one controller, by the interface module, one or more of at least one data dependent command received and the instruction provided by the operator;

said receiving by said each computing unit of the first sub-system including an exchange of at least one message between the each computing unit and said at least one other computing unit of the first sub-system and including simultaneously sending on the first channel and the second channel of the first communication network, the at least one message by the at least one other computing unit to the first redundancy module;

receiving by the first redundancy module, the at least one message that is sent;

if the at least one message is received via the first channel and via the second channel, deleting by the first redundancy module the at least one message that is received via the second channel;

modifying by the first redundancy module, the at least one message that is received by adding an acknowledgment request;

simultaneously disseminating on the first channel and the second channel, the at least one message that is modified to the each computing unit by the first redundancy module;

reception of the at least one message that is modified by the each computing unit and sending of an acknowledgment to the first redundancy module;

said receiving by said each computing unit of the second sub-system comprising an exchange of at least one message between the each computing unit and at least one other computing unit of the second sub-system comprising simultaneously sending on the first channel and the second channel of the second communication network, the at least one message by the at least one other computing unit to the second redundancy module;

receiving by the second redundancy module (1038), the message sent (2132);

if the at least one message is received via the first channel and via the second channel, deleting by the second redundancy module the at least one message that is received via the second channel;

modifying by the second redundancy module, the at least one message that is received by adding an acknowledgment request;

simultaneously disseminating on the first channel and the second channel, the at least one message that is modified to the each computing unit by the second redundancy module;

receiving the at least one message that is modified by the each computing unit and sending an acknowledgment to the second redundancy module.

6. The method according to claim 5, wherein the system further comprises a current time module comprising a plurality of computing units, wherein via the each computing unit of the current time module, the method further comprises replicating at least some of the data, the first information and the second information of the second processing module;

sending, to said each computing unit of the second module that manages the operator stations, the data that is replicated, the first information, and the second information corresponding to the acquisition time immediately preceding the current time.

7. The method according to claim 5, wherein the system further comprises an archiving module comprising a plurality of computing units, wherein via each computing unit of the archiving module, the method further comprises replicating and archiving at least some of the data, the first information and the second information of the second processing module;

sending to said each computing unit of the second module that manages the operator stations, the data that is archived, the first information, and the second information corresponding to each acquisition time preceding the acquisition time immediately preceding the current time.

8. The method according to claim 6, wherein said sending by said each computing unit of the second sub-system comprises an exchange of at least one message between the each computing unit and at least one other computing unit of the second sub-system, including simultaneously sending on the first channel and the second channel of the second communication network, the at least one message by the each computing unit to the second redundancy module;

receiving by the second redundancy module, the at least one message that is sent;

if the at least one message is received via the first channel and via the second channel, deleting by the second redundancy module the at least one message received via the second channel;

modifying by the second redundancy module, the at least one message that is received by adding an acknowledgment request;

simultaneously disseminating on the first channel and the second channel, the at least one message that is modified to the at least one other computing unit;

receiving the at least one message that is modified by the at least one other computing unit and sending an acknowledgment to the second redundancy module.

9. A non-transitory computer program product comprising instructions that, when executed on a computer, lead the computer to implement a method for operating a critical industrial process implemented by a system that operates and assists with operation of the critical industrial process, said system comprising a first set of operator stations each comprising a graphical interface and each being configured to receive instructions from an operator via the graphical interface;

display, at a current time and on request from the operator, first information from a subset of information, the subset of information being comprised in a set of information comprising a group of information for each acquisition time from among a plurality of acquisition times preceding the current time, each group of information comprising first information for operating the critical industrial process and second information for assisting with the operation of the critical industrial process;

a second set of operator stations, each configured to display, at the current time and on request from the operator, the second information from the subset of information;

a first sub-system that operates the critical industrial process working cyclically, a second sub-system that assists with the operation of the critical industrial process working in an event-driven manner, and a unidirectional separating device comprised in the first sub-system and in the second sub-system, comprising a pair of computing units, the first sub-system comprising an interface module configured to collect data from a plurality of programmable logic controllers each having a controller model, each item of data being associated with an acquisition time from the plurality of acquisition times, the interface module including at least one pair of computing units for each controller model, the computing units of the interface module working in asynchronous redundancy;

a first processing module including a pair of computing units, the computing units of the first processing module working in active redundancy;

a first module that manages the operator stations of the first set of operator stations, comprising one computing unit for each operator station in the first set of operator stations, each computing unit being configured to manage the graphical interface of the each operator station corresponding thereto;

a first duplicate communication network having a first channel and second channel that are separate, comprising a first redundancy module distributed over each computing unit of the first sub-system, the second sub-system comprising a second processing module comprising a pair of computing units, the computing units of the second processing module working in active redundancy;

a second module that manages the operator stations of the second set of operator stations, comprising one computing unit for each operator station in the second set of operator stations, each computing unit being configured to manage the graphical interface of the each operator station corresponding thereto;

a second duplicate communication network having a first channel and second channel that are separate, comprising a second redundancy module distributed over each computing unit of the second sub-system;

said method carried out for each cycle of a set of cycles and comprising:

for said each computing unit of said each pair of computing units of the interface module, collecting each item of data that is received by each controller having a corresponding controller model, and eliminating each duplicate data that is received, each item of data being associated with an acquisition time preceding the current time;

receiving, by said each computing unit of the processing module, said data that is collected by the interface module, sorting the data that is received as a function of their acquisition time, eliminating the each duplicate data that is received, computing the first information of the group of information corresponding thereto for said each acquisition time from the data that is sorted and corresponding thereto, and sending to each computing unit of the unidirectional separating device, each first information item that is computed;

receiving, by said each computing unit of the first module that manages the operator stations of the first set of operator stations, each first information item that is computed, and sending to said each operator station in the first set of operator stations, each first information item that is received comprised in the subset of information that is requested by the operator;

receiving, by said each computing unit of the second processing module, the data that is collected and the first information that is computed by the first sub-system, detecting the data and the first information modified since a previous cycle, eliminating any duplicate data and the first information received, and computing of the second information of the group of information for said each acquisition time, from the data that is detected and corresponding thereto and the first information;

receiving, by said each computing unit of the second module that manages the operator stations of the second set of operator stations, each computed second information item, and sending to said each operator station in the second set of operator stations, each second information item that is received and comprised in the subset of information subset requested;

displaying the first information of the subset of information requested by said each operator station of the first set of operator stations and of the second information of the subset of information requested by said each operator station of the second set of operator stations, at the current time;

if the operator provides an instruction via the graphical interface of an operator station in the first set of operator stations, sending the instruction to the interface module;

sending to at least one controller, by the interface module, one or more of at least one data dependent command received and the instruction provided by the operator;

said receiving by said each computing unit of the first sub-system including an exchange of at least one message between the each computing unit and said at least one other computing unit of the first sub-system and including simultaneously sending on the first channel and the second channel of the first communication network, the at least one message by the at least one other computing unit to the first redundancy module;

receiving by the first redundancy module, the at least one message that is sent;

if the at least one message is received via the first channel and via the second channel, deleting by the first redundancy module the at least one message that is received via the second channel;

modifying by the first redundancy module, the at least one message that is received by adding an acknowledgment request;

simultaneously disseminating on the first channel and the second channel, the at least one message that is modified to the each computing unit by the first redundancy module;

reception of the at least one message that is modified by the each computing unit and sending of an acknowledgment to the first redundancy module;

said receiving by said each computing unit of the second sub-system comprising an exchange of at least one message between the each computing unit and at least one other computing unit of the second sub-system comprising simultaneously sending on the first channel and the second channel of the second communication network, the at least one message by the at least one other computing unit to the second redundancy module;

receiving by the second redundancy module (1038), the message sent (2132);

if the at least one message is received via the first channel and via the second channel, deleting by the second redundancy module the at least one message that is received via the second channel;

modifying by the second redundancy module, the at least one message that is received by adding an acknowledgment request;

simultaneously disseminating on the first channel and the second channel, the at least one message that is modified to the each computing unit by the second redundancy module;

receiving the at least one message that is modified by the each computing unit and sending an acknowledgment to the second redundancy module.

10. The non-transitory computer program product according to claim 9, wherein the non-transitory computer program product is written in ADA language.

* * * * *